Patented May 8, 1923.

1,454,369

UNITED STATES PATENT OFFICE.

AAGE NIELS JACK ZIRSEN, OF MONTREAL, QUEBEC, CANADA.

COMPOUND FOR THE SHARPENING OF TOOLS.

No Drawing.   Application filed April 20, 1921.  Serial No. 462,925.

*To all whom it may concern:*

Be it known that I, AAGE NIELS JACK ZIRSEN, a subject of the King of Denmark, residing at the city of Montreal, in the Province of Quebec, Canada, engineer, have invented certain new and useful Improvements in Compound for the Sharpening of Tools, of which the following is a specification.

This invention relates to a compound whereby tools such as files can be rapidly resharpened.

The object is to provide a convenient means of restoring the keenness of worn tools such as files.

A number of mixtures for this purpose are known and in my U. S. Patent No. 1,161,816 November 23, 1915, I employed a mixture consisting of fuming sulphuric acid and nitric acid with water.

This invention covers an improved mixture which consists of fuming sulphuric acid or what is known as Nordhausen oil of vitriol, fuming nitric acid and pure nitric acid and water in the following proportions: approximately:—

|                        | Grams. |
|------------------------|--------|
| Fuming sulphuric acid  | 450    |
| Fuming nitric acid     | 350    |
| Pure nitric acid       | 250    |

This mixture is added to from five to twenty times the amount of water.

In preparing this compound I take a quantity of fuming sulphuric acid and add thereto the proper amount as above set forth of fuming nitric acid, to this mixture is added the proper proportion of pure nitric acid.

This mixture can be prepared in bulk and stored in suitable acid proof containers. Furthermore it can be put into small acid proof containers and distributed to machine shops and tool dealers in suitable quantities.

In preparing the aqueous solution for use the acid mixture is added to from five to twenty times the amount of pure water. The strength of the solution will depend on the nature of the articles to be treated. A weaker solution being employed for the finer grades of tools.

The tools to be treated must be thoroughly cleansed and I prefer to submit them to a steam or air sand blast for the purpose.

The cleansed tools are then dipped into a bath of the aqueous solution and are allowed to remain therein for a short period varying from a few seconds for the finer instruments up to several minutes for coarser articles.

Upon withdrawal the tools are again cleansed to remove the coating of the solution and are then ready for use.

By means of this treatment the tools are made keen and the quality and hardness of the metal is not affected.

The treatment may be repeated to keep the tools in good condition, whenever necessary.

I claim:

1. A compound for use in sharpening files and the like which consists of fuming sulphuric acid, fuming nitric acid and pure nitric acid diluted with water.

2. A compound for use in sharpening files and the like which consists of 450 grams fuming sulphuric acid, 350 grams fuming nitric acid and 250 grams of pure nitric acid diluted with from five to twenty times the amount of water as described.

3. A compound for use in sharpening files and the like which consists in mixing 350 grams of fuming nitric acid with 450 grams of fuming sulphuric acid and adding thereto 250 grams of pure nitric acid, the mixture being diluted with water.

4. A compound for use in sharpening files and the like which consists of a mixture of fuming sulphuric acid, fuming nitric acid and pure nitric acid in the proportions specified.

AAGE NIELS JACK ZIRSEN.